US 8,570,604 B2

(12) United States Patent
Bane et al.

(10) Patent No.: US 8,570,604 B2
(45) Date of Patent: Oct. 29, 2013

(54) PRINTER AND METHOD FOR PRINTING OF OVERLAPPING SWATHES

(75) Inventors: Julian Bane, Cambridge (GB); Steve Temple, Cambridge (GB); Paul Raymond Drury, Royston (GB)

(73) Assignee: Xaar Technology Limited, Cambridgeshire (GB)

(*) Notice: Subject to any disclaimer, the term of this patent is extended or adjusted under 35 U.S.C. 154(b) by 823 days.

(21) Appl. No.: 12/443,739

(22) PCT Filed: Oct. 3, 2007

(86) PCT No.: PCT/GB2007/003748
§ 371 (c)(1),
(2), (4) Date: May 21, 2009

(87) PCT Pub. No.: WO2008/040968
PCT Pub. Date: Apr. 10, 2008

(65) Prior Publication Data
US 2010/0007898 A1    Jan. 14, 2010

(30) Foreign Application Priority Data

Oct. 3, 2006 (GB) .................................. 0619523.4

(51) Int. Cl.
*G06F 3/12* (2006.01)
*G06K 15/10* (2006.01)
*H04N 1/60* (2006.01)
*H04N 1/405* (2006.01)
*B41J 2/01* (2006.01)
*B41J 2/175* (2006.01)
*B41J 2/18* (2006.01)

(52) U.S. Cl.
USPC ............. 358/3.26; 358/1.1; 358/1.8; 358/1.9; 358/3.1; 347/1; 347/86; 347/91

(58) Field of Classification Search
USPC .......... 358/3.26, 502, 505, 1.2, 2.1, 2.99, 1.4,
358/1.8, 1.1, 1.13, 1.9, 3.03, 3.1, 3.12, 3.2,
358/3.27, 448, 474, 1.12; 347/1, 101, 174,
347/179, 173, 182, 186, 2, 3, 8, 14, 86, 91,
347/105, 211, 200, 129, 19, 32, 110, 502,
347/538, 540; 382/163, 167, 178, 291, 294,
382/293
See application file for complete search history.

(56) References Cited

U.S. PATENT DOCUMENTS 5,992,994 A * 11/1999 Rasmussen et al. .......... 347/104
6,069,709 A *  5/2000 Harrington .................... 358/1.8
(Continued)

FOREIGN PATENT DOCUMENTS

EP    0738068    * 10/1996
EP    1473662    *  3/2004

OTHER PUBLICATIONS

International Preliminary Report on Patentability for Application No. PCT/GB2007/003748, dated Apr. 7, 2009.
International Search Report and Written Opinion for PCT/GB2007/003748 dated Jan. 29, 2008.

*Primary Examiner* — Benny Tieu
*Assistant Examiner* — Ngon Nguyen
(74) *Attorney, Agent, or Firm* — Marshall, Gerstein & Borun LLP

(57) ABSTRACT

A method for controlling the printing of overlapping swathes, the swathes extending perpendicular to a succession of print lines; for each print line a transition is defined between one swathe and the next, with the location of the transition in the print line varying between print lines, for example varying pseudo-randomly or as a curve extending in the swathe direction.

13 Claims, 7 Drawing Sheets

(56) References Cited

U.S. PATENT DOCUMENTS

| | | | |
|---|---|---|---|
| 6,145,959 A * | 11/2000 | Lund et al. | 347/40 |
| 6,450,614 B1 * | 9/2002 | Scheffelin et al. | 347/42 |
| 7,388,686 B2 * | 6/2008 | Saquib et al. | 358/1.8 |
| 7,591,521 B2 * | 9/2009 | Aruga | 347/13 |
| 8,205,953 B2 * | 6/2012 | Azuma et al. | 347/14 |
| 2003/0058295 A1 * | 3/2003 | Heiles et al. | 347/19 |
| 2003/0202215 A1 * | 10/2003 | Biddle et al. | 358/3.26 |
| 2005/0248631 A1 * | 11/2005 | Pinard et al. | 347/74 |

\* cited by examiner

PRINTER AND METHOD FOR PRINTING OF OVERLAPPING SWATHES

BACKGROUND OF THE INVENTION

1. Field of the Invention

This invention relates to the field of printing and particularly raster printing. In particular, examples of the invention are concerned with the difficulties faced in printing a 'page-wide' image with a printhead that is not 'page-wide'.

2. Description of Related Art

This problem is commonly addressed either by using a single printhead to perform several passes over the same page, in which case the different passes may occur in different scanning directions, or with several printheads attached to a rigid frame known as a printhead bar. In each case, the area addressed by each printhead during printing is known as a swathe.

In order to form a page-wide image the swathes addressed by the printheads must form a mosaic covering the whole of the printed image area. However, the printed image resulting from a mosaic of print swathes is often found to have visible artefacts. Causative factors include "end effects" at the ends of the print heads and also mechanical errors and random errors in the both the heads and the system mechanics. The discontinuities can be in image density, image features or both.

The above effects are especially noticeable in printing situations where the substrate is printed in a single pass (material passes under the print heads only once) and especially in coating and deposition systems where film uniformity is critical. An array of static print heads (or actuators) printing onto a web moving continuously in one direction is a common example.

Similarly, a head (or array of heads) capable of printing a fully-formed image in a single pass can be used in a scanning mode—where the substrate is moved in a feed direction perpendicular to the print direction after each pass—thus, the second pass addresses a swathe parallel to the first printed swathe, but spaced in the substrate feed direction.

Typically it is desirable to have some overlap between the swathes so that errors in alignment of neighbouring swathes do not lead to elongate regions of unprinted substrate, which are highly visible to the human eye. In these regions of overlap, the substrate is therefore addressed twice (or possibly more)—either by a single pass of multiple overlapping printheads or by a single printhead passing multiple times or a combination of the two. Since the overlap region must not be printed with double weight it is necessary to manage the deposition of print-pixels in the overlap regions.

"Stitching" in this disclosure is defined as the management and printing of the print-pixels deposited at the interface between two swathes as stated above. Stitching is concerned with the edges of a specific swathe and that of another swathe that is adjacent to it. Interleaving of swathes may be employed to print alternate drops in a print area and then filling in the rest during a later print of a different swathe. This interleaving technique is independent of stitching and may be used in conjunction with it.

One common factor in the implementation of these techniques is that the effective width of the printhead is reduced as the swathes are required to overlap.

Raster printing involves the deposition of print-pixels in a grid, in the overlapping regions it is therefore possible to select on a pixel-by-pixel basis to which swathe a pixel in a print image is assigned. Inkjet printing is a typical raster printing method where the printed image is formed of a grid of ink dots on the substrate.

An example of the process of stitching for two swathes is illustrated in FIG. 1, which shows two swathes—A and B—and their region of overlap (diagonally shaded area), which is m pixels wide. In this and the following figures, no presumption is made as to the order, the direction or the sequencing of swathe 'A' and swathe 'B'. They need not be printed consecutively or from the same printhead. For example, swathe A may be formed by a first pass of a single printhead in direction 1 and swathe B formed by the second pass in direction 2, or equally both may be formed by a single pass in direction 1 or 2 of two overlapping printheads. Printheads may produce drops of a single consistent size (binary) or variable size (greyscale). All print-pixels in FIG. 1 are of identical size for the purposes of clarity.

Two swathes, swathe 'A' and swathe 'B', are printed in such a way that there is an overlap region (diagonally shaded area) where a number of pixel locations can be printed as part of either swathe 'A' or swathe 'B'.

If a specific pixel in the stitching area is required to be printed then it is either printed during the printing of swathe 'A' or swathe 'B'. It is required to determine on a pixel by pixel basis for each pixel in the stitching area (diagonally shaded area) whether it will be printed as part of swathe 'A' or swathe 'B'.

In an example stitching method illustrated in FIG. 2, referred to herein as 'soft-stitch', the stitching area (diagonally shaded area) of the swathes is 'm' pixels wide. FIG. 2 shows this as 3 pixels but it may be any number provided that it is less than the width of the printhead. Typically it would be between 1 line and 10% of the head width.

The probability of deciding whether to print a given pixel in swathe 'A' is a mathematical function of 'm' and 'n' as defined above.

$p(A) \propto (n/(m+1))^i$ where 'i' is any suitable power.

For example:

$p(A)=(n/(m+1))^i * RND$ where RND produces a uniform probability.

if $p(A) > 0.5$ then print using swathe A, else print using swathe B

The value of $(n/(m+1))^i$ may also be used as an index into a "dither table", suitably scaled by the dimension of the table. This table may be any form of dither table and would include; "ordered dither", "random dither" or "blue noise dither".

SUMMARY OF THE INVENTION

However, the applicant has recognised that such a stitching method will nonetheless result in visible artefacts in the printed image. Through identification and analysis of the causes of stitching artefacts with such methods the applicant has arrived at the solution offered by the present invention. FIGS. 3-6 illustrate common causes of stitching artefacts.

FIG. 3 shows an ideal pattern printed by overlapping swathes A and B and the overlapping area of width m where 'soft-stitching' has been performed. The print-pixels of the two swathes (A and B) are illustrated with different shadings for clarity, so that the assignment of pixels in the overlap region to each swathe is visible. Here, the pixels in the two swathes (A and B) are of identical size and are aligned with imperceptible error.

FIG. 4 shows stitching between swathes A and B that are offset by a distance d perpendicular to the swathe direction (1 or 2), where d is a non-integral number of pixel-spacings. Such alignment errors are common both with printhead bars and with printheads working in a scanning mode. Here, the stitching process has resulted in the creation of overlapping pixels (11), thus leaving several gaps (10) in the printed pattern. The bulk effect of such gaps is to create a band of lighter tone in the finished image. This band is aligned with the print direction, thus being elongate and as such highly visible to the human eye, which is adept at identifying straight lines.

FIG. 5 shows stitching between swathes A and B that are offset by a distance d parallel to the swathe direction (1 or 2), where d is a non-integral number of pixel-spacings. Again, this results in a highly visible band of lighter tone of width m in the finished image.

FIG. 6 shows stitching between swathes A and B that have print-pixels of different sizes. With large enough errors in optical density this may also result in a visible band of width m in the printed image.

Accordingly, the present invention provides a method for controlling the printing of overlapping swathes, resulting in improved print quality.

According to a first aspect of the invention there is provided a method for controlling the printing of overlapping swathes extending in a swathe direction with a succession of print lines extending perpendicular to the swathe direction, comprising the step of defining for each print line a transition between one swathe and the next, with the location of the transition in the print line varying between print lines.

Preferably, the location of the transition in the print line varies as a function of displacement in the swathe direction.

BRIEF DESCRIPTION OF THE DRAWINGS

The invention will now be described with reference to the Figures, wherein:

FIG. 1 shows two swathes of print and the region of overlap between.

DETAILED DESCRIPTION OF THE INVENTION

Figure 1:
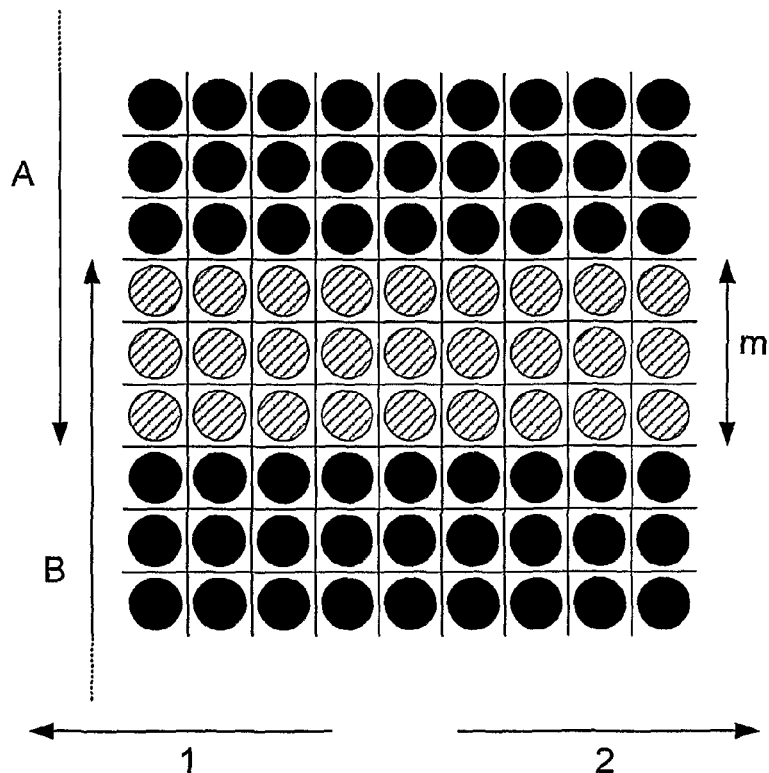
Figure 2:
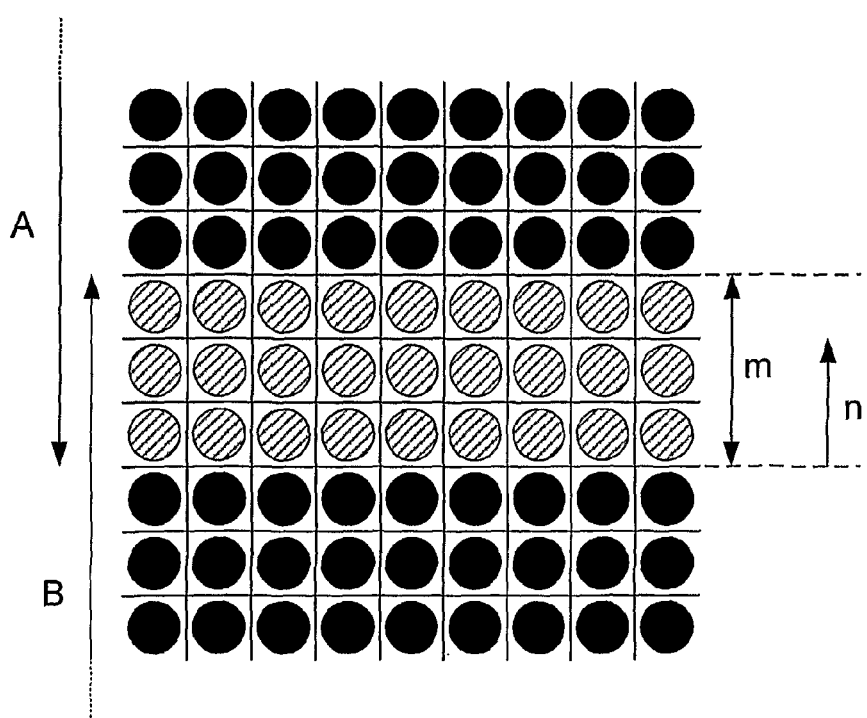
FIG. 2 displays a known stitching system referred to herein as 'soft-stitch' applied to the swathes of print shown in FIG. 1.
Figure 3:
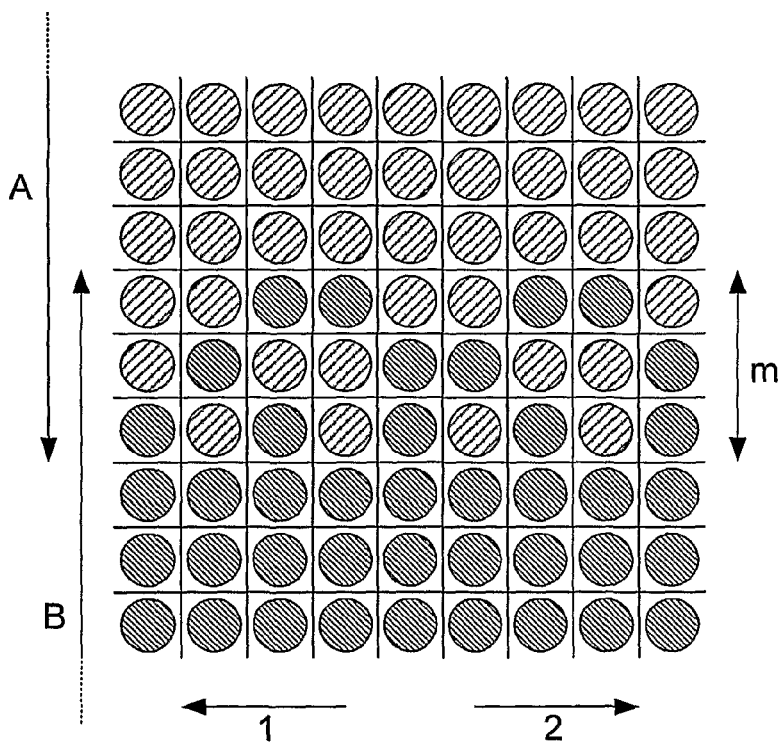
FIG. 3 illustrates the result of a prior art stitching system carried out for two perfectly aligned print swathes.
Figure 4:
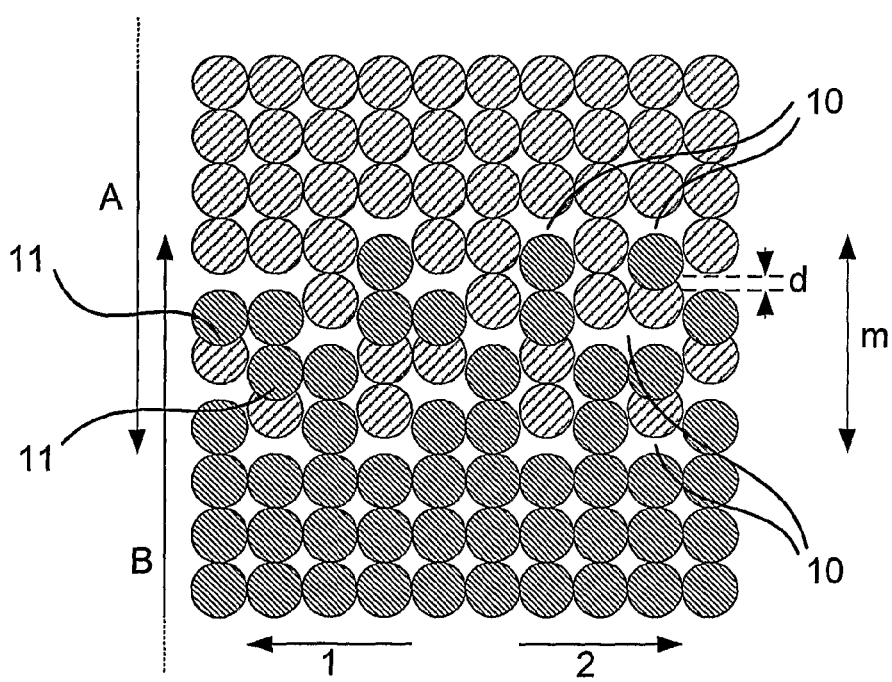
FIG. 4 illustrates the result of the prior art stitching system of FIG. 3 when applied to swathes misaligned perpendicular to the swathe direction.
Figure 5:
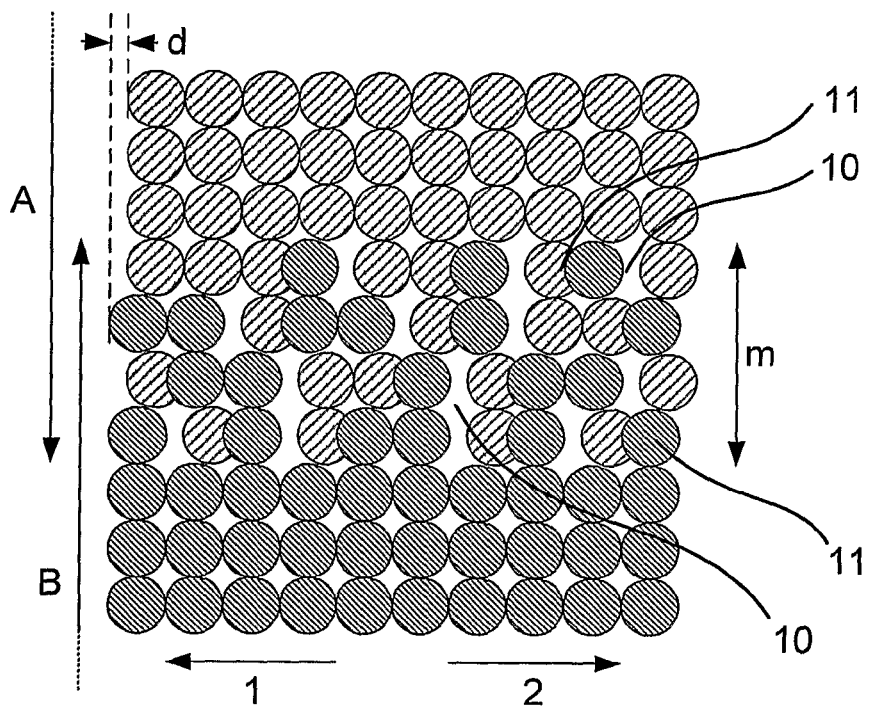
FIG. 5 illustrates the result of the prior art stitching system of FIG. 3 when applied to swathes misaligned parallel to the swathe direction.
Figure 6:
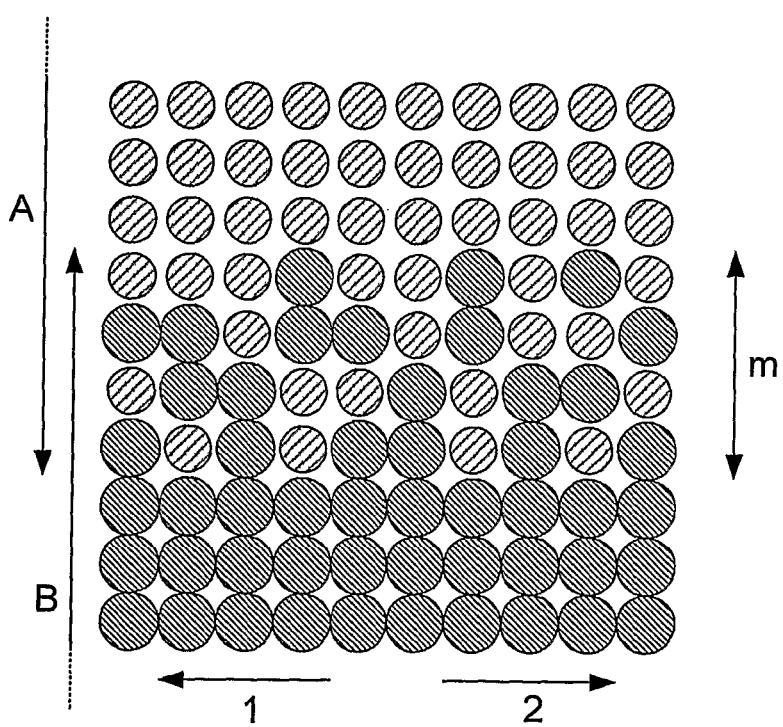
FIG. 6 illustrates the result of the prior art stitching system of FIG. 3 when applied to swathes having mismatched print-pixel sizes.

The path traced by the interface of the two swathes is called the stitch line. This line is traditionally a straight line running parallel to the relative motion of the printhead and the substrate. In the example illustrated in FIG. 2, referred to as a "soft-stitch", the nominal centreline of the stitch runs parallel to the direction of travel of the swathes (1 or 2).

Figure 7:
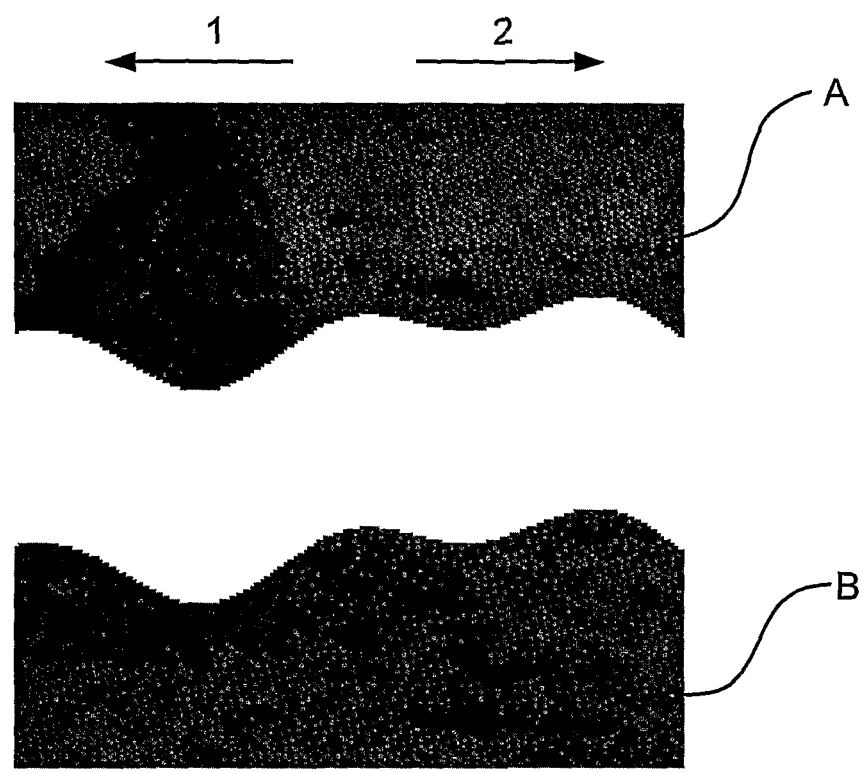
FIG. 7 illustrates an embodiment of the invention referred to herein as 'profile stitching'.

FIG. 7 illustrates a method in accordance with a first embodiment of the invention, referred to herein as "profile-stitching". The figure shows two swathes (A and B) that combine to form an image of continuous tone. The two swathes are illustrated as regions of shaded pixels in the figure and therefore are spaced apart perpendicular to the possible swathe directions (1 and 2) for clarity. As before, no presumption is made as to the order of printing of the two swathes (A and B) and the swathes may be printed in the same or opposite directions (possible swathe directions are shown as 1 and 2). In this technique, the centreline of the stitch no longer runs parallel to the direction of travel of the printhead(s). The path of this line may be of any non-straight line whether mathematically calculated or randomly derived. In the figure the centreline is illustrated as a waved line. In the printed image the visibility of the centreline to the human eye will be minimised as it is no longer a linear feature.

Using this method the usable width of the swath is reduced and an overlap area is used to achieve a continuous print. The size of the overlap also dictates the magnitude of the profile of stitch.

Figure 8:
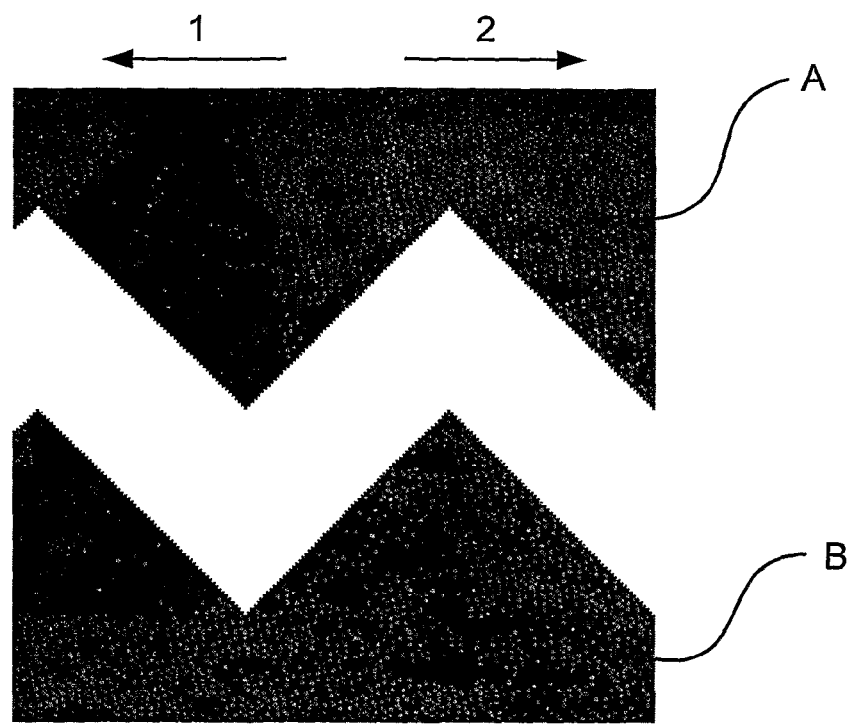
FIG. 8 illustrates an embodiment of the invention referred to herein as 'diagonal stitching'.

FIG. 8 illustrates in a similar manner a method in accordance with a second embodiment of the invention, referred to herein as 'diagonal stitching'. This is very similar to the 'profile-stitch' except that the centreline of the stitch is made up of diagonal lines at any set or varying angles so as to prevent a stitch centreline running parallel to any printed swath at any time.

Using this method the usable width of the swath is reduced and an overlap area is used to achieve a continuous print. Again, the size of the overlap also dictates the magnitude of the profile of stitch.

Figure 9:
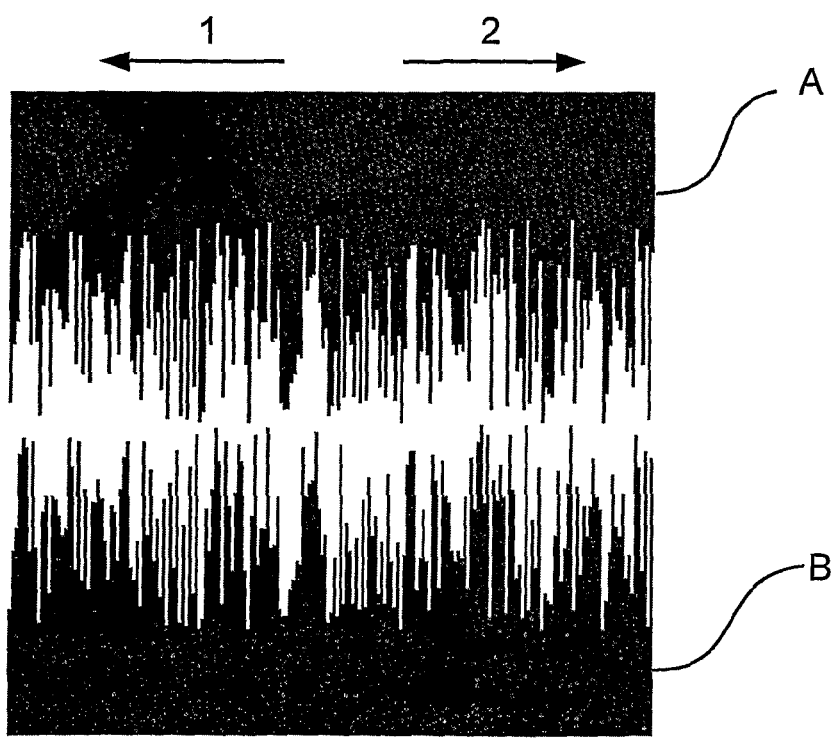
FIG. 9 illustrates an embodiment of the invention referred to herein as 'pin stitching'.

FIG. 9 illustrates in the same manner a method in accordance with a third embodiment of the invention, referred to herein as 'pin-stitching'. This is again similar to the 'profile stitch' but in this case the stitch centreline is set randomly for each line of pixels that is laid down in the print direction (1 or 2) and results in a jagged edge to region printed by each swathe (A and B). The position of the centreline of the stitch is not influenced in any way by the position of the stitch centreline in either the preceding or the subsequent lines of pixels. Again, size of the overlap also limits the magnitude of the profile of stitch.

Figure 10:
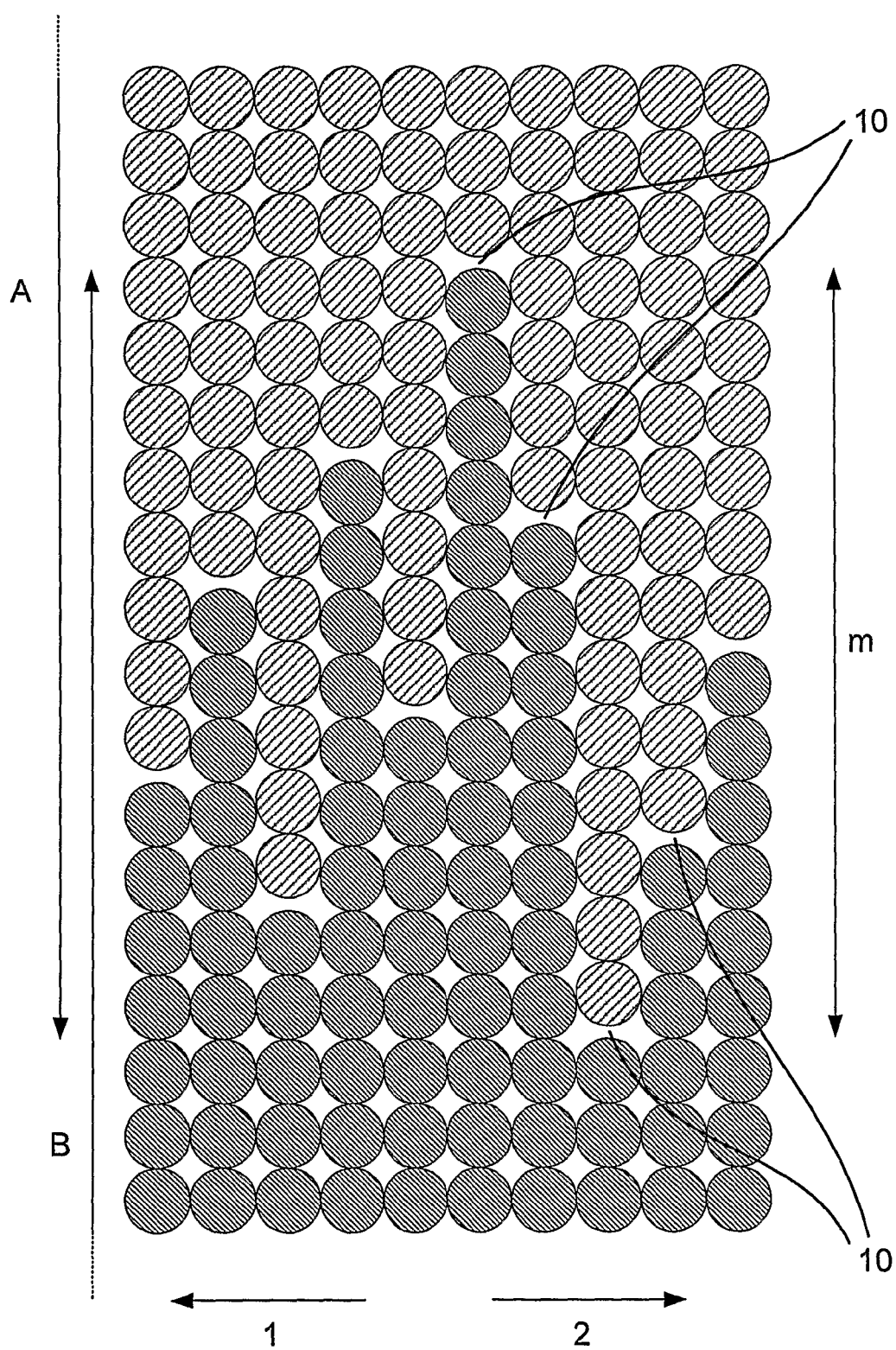
FIG. 10 illustrates how an embodiment of the invention alleviates visual artefacts.

The 'pin-stitch' method is particularly advantageous in overcoming image artefacts due to alignment errors perpendicular to the swathe direction. As illustrated in FIG. 10 the resultant print image will have only one gap (10) per print line, these gaps being randomly distributed throughout the stitching region. Such gaps are far too few in number to cause a perceptible difference in the optical density of the stitching region.

The stitching methods described above may optionally be combined with the 'Soft Stitching' technique. In this case the 'soft stitching' can be used to soften the transition between regions printed in different swathes.

Figure 11:
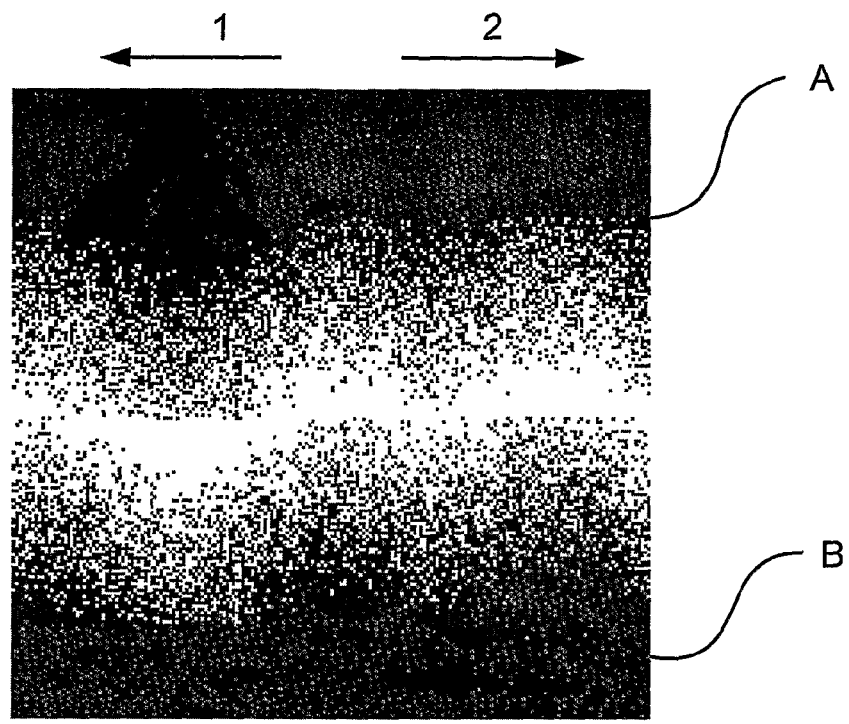
FIG. 11 illustrates a further embodiment of the invention using a combination of 'profile stitching' and 'soft stitching'.
Figure 12:
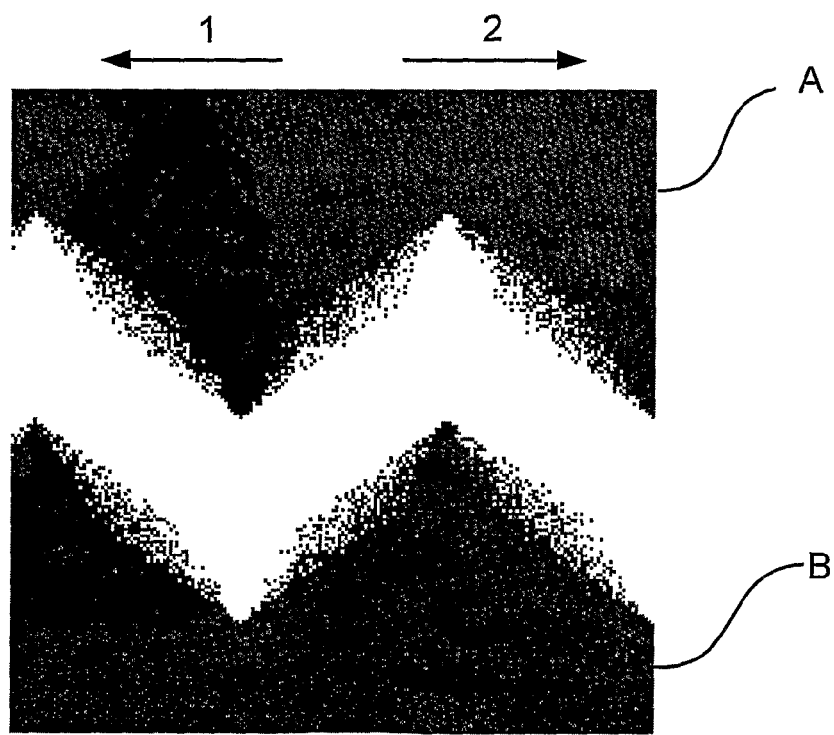
FIG. 12 illustrates a further embodiment of the invention using a combination of 'diagonal stitching' and 'soft stitching'.

FIG. 11 displays two print swathes (A and B) generated using a combination of a 'profile-stitch' and 'soft-stitch'. Again, the two regions have been separated for the purposes of illustration. FIG. 12 displays an example of the combination of 'diagonal stitch' and 'soft stitch'

Care however must be taken when using 'soft stitch' to soften the transition in order that the limits of the variation of the stitch line added to the width of the soft stitch do not exceed the limits of the overlap. To this end the probability function used to determine which swath is to print a particular pixel in the soft stitch algorithm may be modified to include positional information about the centreline of the stitch within the overlap area. Indeed, with greyscale printing, it is possible to form an overlapping pixel in part during one print swathe, in part during another print swathe.

It will be apparent to those skilled in the art that the aforementioned techniques for stitching may be applied to any raster image format printing apparatus, including both greyscale and binary inkjet printing.

The invention claimed is:

1. A method for controlling printing utilizing a plurality of overlapping printheads attached to a rigid frame of a respective plurality of overlapping swathes extending in a print direction with a succession of print lines extending perpendicular to the print direction, each swathe being an area addressed by a respective printhead during printing, there being at least one overlap region where said swathes overlap so that a number of pixels can be printed by either one printhead or a next printhead, the method comprising the steps of:

determining, for each pixel in said overlap region whether said pixel will be printed by said one printhead or said next printhead, said determining step including defining for each print line a transition region between a contiguous array of pixels printed by said one printhead and a contiguous array of pixels printed by said next printhead, said transition region extending over a number of adjacent transition pixels in the print line;

varying a location of the transition region, in a direction perpendicular to the print direction, between different print lines within the same overlap region; and printing said plurality of overlapping swathes with said plurality of overlapping printheads attached to a rigid frame.

2. A method according to claim 1, wherein the location of the transition region in the print lines varies as a function of displacement in the print direction.

3. A method according to claim 1, wherein the location of the transition region in the print lines is randomly derived or pseudo-randomly derived.

4. A method according to claim 1, wherein the transition pixels are assigned to said one printhead or said next printhead according to an algorithm.

5. A method according to claim 4, wherein said algorithm comprises a probability function.

6. A method according to claim 4, wherein the transition pixels are assigned according to a dithering algorithm.

7. A method according to claim 1, wherein the transition pixels take weighted contributions from said one printhead or said next printhead.

8. A method according to claim 1, wherein a center of said transition region, as measured perpendicular to the print direction, is varied between different print lines within the same overlap region.

9. A method according to claim 8, wherein a location of a center of said transition region is mathematically calculated or randomly derived for the print lines.

10. A printer comprising a plurality of overlapping printheads attached to a rigid frame and a controller, wherein the printer is adapted to form an image from a respective plurality of overlapping swathes extending in a print direction with a succession of print lines extending perpendicular to the print direction, each swathe being an area addressed by a respective printhead during printing, there being at least one overlap region where said swathes overlap so that a number of pixels can be printed by either one printhead or a next printhead and wherein said controller is operable to carry out a determination, for each pixel in each said overlap region as to whether said pixel will be printed by said one printhead or said next printhead, said determination being such that for each print line a transition region is defined between a contiguous array of pixels printed by said one printhead and a contiguous array of pixels printed by said next printhead, said transition region extending over a number of adjacent transition pixels in the print line, with a location of the transition region in the print line varying, in a direction perpendicular to the print direction, between different print lines within the same overlap region.

11. Apparatus according to claim 10, further comprising substrate feed means operable to move a substrate relative to said printer in a feed direction.

12. Apparatus according to claim 11, wherein said at least one printhead is moveable under the influence of said controller perpendicular to said feed direction.

13. Apparatus according to claim 11, wherein said print direction is parallel to said feed direction.

\* \* \* \* \*

UNITED STATES PATENT AND TRADEMARK OFFICE
CERTIFICATE OF CORRECTION

PATENT NO.        : 8,570,604 B2
APPLICATION NO. : 12/443739
DATED             : October 29, 2013
INVENTOR(S)      : Bane et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1053 days.

Signed and Sealed this
Twenty-second Day of September, 2015

Michelle K. Lee
*Director of the United States Patent and Trademark Office*